(12) United States Patent
Han et al.

(10) Patent No.: US 12,522,072 B1
(45) Date of Patent: Jan. 13, 2026

(54) VEHICLE STEERING DEVICE

(71) Applicant: HYUNDAI MOBIS CO., LTD., Seoul (KR)

(72) Inventors: Chi Yun Han, Suwon-si (KR); Yoong Kyung Hwang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 19/203,834

(22) Filed: May 9, 2025

(30) Foreign Application Priority Data

Jul. 15, 2024 (KR) .................. 10-2024-0093354

(51) Int. Cl.
| | |
|---|---|
| *B60K 35/60* | (2024.01) |
| *B60K 35/53* | (2024.01) |
| *B60N 3/00* | (2006.01) |
| *B60R 11/00* | (2006.01) |
| *B60R 11/02* | (2006.01) |
| *B60R 16/03* | (2006.01) |
| *B62D 1/06* | (2006.01) |
| *B62D 1/187* | (2006.01) |

(52) U.S. Cl.
CPC .............. *B60K 35/60* (2024.01); *B60K 35/53* (2024.01); *B60N 3/001* (2013.01); *B60R 11/0252* (2013.01); *B60R 16/03* (2013.01); *B62D 1/06* (2013.01); *B62D 1/187* (2013.01); *B60K 2360/595* (2024.01); *B60K 2360/685* (2024.01); *B60K 2360/693* (2024.01); *B60K 2360/834* (2024.01); *B60R 2011/001* (2013.01); *B60R 2011/0082* (2013.01)

(58) Field of Classification Search
CPC .. B60K 35/60; B60K 35/53; B60K 2360/685; B60K 2360/693; B60K 2360/834; B60K 35/55; B60N 3/001; B60R 11/0252; B60R 2011/001
See application file for complete search history.

(56) References Cited

U.S. PATENT DOCUMENTS

| | | | |
|---|---|---|---|
| 8,002,179 B2 * | 8/2011 | Feit ................. | B60K 35/53 235/382 |
| 9,218,057 B2 * | 12/2015 | Aoki ................. | G06F 3/013 |
| 11,908,375 B2 * | 2/2024 | Kobata ............. | B60K 35/60 |

FOREIGN PATENT DOCUMENTS

| | | | | |
|---|---|---|---|---|
| CN | 106275055 B | * | 10/2018 | ............. B62D 1/183 |
| CN | 108819866 A | * | 11/2018 | ......... B60R 11/0241 |

(Continued)

OTHER PUBLICATIONS

Computer generated English translation of CN 106275055 (Year: 2025).*

(Continued)

*Primary Examiner* — Paul N Dickson
*Assistant Examiner* — Tiffany L Webb
(74) *Attorney, Agent, or Firm* — NovoTechIP International PLLC (57) ABSTRACT

Disclosed is a vehicle steering device. The vehicle steering device includes: a steering wheel; a shroud coupled with the steering wheel and including, in an upper portion thereof, a mounting groove configured to mount a user terminal; and a mounting cover hingedly coupled to the upper portion of the shroud. In response that the mounting cover is rotated, the mounting groove is exposed to allow the user terminal to be mounted via the mounting groove and the mounting cover.

12 Claims, 12 Drawing Sheets

(56) References Cited

FOREIGN PATENT DOCUMENTS

| CN | 109050423 | A | * | 12/2018 | ......... | B60R 11/0241 |
| CN | 108460860 | B | * | 6/2022 | ............ | B60K 35/28 |
| CN | 116745160 | A | * | 9/2023 | ............ | B60K 35/10 |
| DE | 102021214343 | A1 | * | 6/2023 | ............ | B60K 35/22 |

OTHER PUBLICATIONS

Computer generated English translation of CN 108460860 (Year: 2025).*
Computer generated English translation of CN 108819866 (Year: 2025).*
Computer generated English translation of CN 109050423 (Year: 2025).*
Computer generated English translation of CN 116745160 (Year: 2025).*
Computer generated English translation of DE 102021214343 (Year: 2025).*

* cited by examiner

VEHICLE STEERING DEVICE

CROSS-REFERENCE TO RELATED APPLICATIONS

This application is based on and claims priority under 35 U.S.C. 119 to Korean Patent Application No. 10-2024-0093354, filed on Jul. 15, 2024, in the Korean Intellectual Property Office, the disclosure of which is herein incorporated by reference in its entirety.

TECHNICAL FIELD

The present disclosure relates to a vehicle steering device.

BACKGROUND

Automotive technology has been continuously evolving, with various vehicle functions becoming increasingly and complexly integrated. Steering systems, beyond their fundamental roles of simply controlling the directions of vehicles, have advanced to implement auxiliary functions such as executing hands-free calling and semi-autonomous driving modes.

Meanwhile, electrification has emerged as a major trend in the automotive industry. Electrification is reducing the need for mechanical components while promoting a design trend of omitting unnecessary parts. As a result, vehicle interiors are becoming increasingly streamlined and stylish, giving users more room to design their vehicle interiors to suit their preferences.

The foregoing described as the background art is intended merely to aid in the understanding of the background of the present disclosure, and is not intended to mean that the present disclosure falls within the purview of the related art already known to those skilled in the art.

SUMMARY

The present disclosure aims to provide a vehicle steering device that conforms to the trends of vehicle electrification and simplified design.

The technical subjects pursued in the present disclosure may not be limited to the above-mentioned technical subjects, and other technical subjects which are not mentioned may be clearly understood from the following descriptions by those skilled in the art to which the present disclosure pertains.

In view of the foregoing, the vehicle steering device includes: a steering wheel; a shroud coupled with the steering wheel and including, in an upper portion thereof, a mounting groove configured to mount a user terminal; and a mounting cover hingedly coupled to the upper portion of the shroud. When the mounting cover is rotated, the mounting groove is exposed to allow the user terminal to be mounted via the mounting groove and the mounting cover.

The mounting groove may extend along a width direction of the vehicle and be provided at multiple points on the upper portion of the shroud, allowing a mounting position of the user terminal to be adjusted depending on a size or a mounting angle of the user terminal.

One end of the mounting cover may be hingedly coupled to the shroud, and the other end of the mounting cover may be provided with a hingedly coupled mounting pad to support a rear surface of the user terminal.

The mounting pad may include a charging module configured to charge a battery of the user terminal.

The mounting pad may include a side support configured to support a side surface of the user terminal.

The mounting cover may include thereon a shading panel which is slid to be exposed to an outer side of the mounting cover or to be retracted into an inner side of the mounting cover.

The vehicle steering device may further include a controller. The controller may be configured to transmit driving-related information of the vehicle to the mounted user terminal, and the user terminal may be configured to send the information to a display.

The steering wheel may include a table hingedly coupled to a lower portion thereof to be deployed by rotation.

The table may include an auxiliary table slidably coupled to one surface thereof.

The vehicle steering device may further include a controller and an electric motor provided inside the steering wheel and configured to adjust a deployment angle of the table. The controller may control the electric motor depending on a tilting angle of the steering wheel to adjust the deployment angle of the table such that the table remains parallel to the ground.

The vehicle steering device may further include a controller, and during the deployment of the table, the controller may change the tilting angle of the steering wheel to maintain the table parallel to the ground.

The steering wheel may be of a yoke type.

A vehicle steering device according to the present disclosure is configured such that a user terminal can be mounted thereon, enabling a user to use the user terminal in a more intuitively accessible position, thereby improving convenience.

In addition, by using a yoke-type steering wheel, better visibility of the user terminal may be ensured. The user terminal may function as an instrument cluster.

Moreover, the steering wheel is provided with a table capable of being used when the vehicle is stationary, enhancing convenience and enabling assistance with various activities during in-vehicle rest.

Advantageous effects obtainable from the present disclosure may not be limited to the above-mentioned effects, and other effects which are not mentioned may be clearly understood from the following descriptions by those skilled in the art to which the present disclosure pertains.

BRIEF DESCRIPTION OF THE DRAWINGS

The above and other aspects, features, and advantages of the present disclosure will be more apparent from the following detailed description taken in conjunction with the accompanying drawings, in which:

FIG. 3 is a side view of the vehicle steering device illustrated to explain mounting of a user terminal through a mounting groove, the mounting pad, and the like;

DETAILED DESCRIPTION

In describing the embodiments set forth herein, a detailed description of known functions or configurations incorporated herein will be omitted when it is determined that the description may make the subject matter of the embodiments set forth herein unclear. In addition, it should be appreciated that the accompanying drawings are provided only for the sake of easy understanding of the embodiments set forth herein, and the technical idea of the present disclosure is not limited to the accompanying drawings and includes all modifications, equivalents, or alternatives falling within the spirit and scope of the present disclosure.

Terms including an ordinal number such as "a first" and "a second" may be used to describe various elements, but the elements are not limited to the terms. The above terms are used merely for the purpose of distinguishing one element from other elements.

A singular expression may include a plural expression unless they are definitely different in a context.

As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

The terms "module" and "unit" used for the elements in the following description are given or interchangeably used in consideration of only the ease of writing the specification, and do not have distinct meanings or roles by themselves.

In the case where an element is referred to as being "connected" or "coupled" to any other elements, it should be understood that not only the element may be directly connected or coupled to the other elements, but also another element may exist therebetween. Contrarily, in the case where an element is referred to as being "directly connected" or "directly coupled" to any other element, it should be understood that no other element exists therebetween.

A controller may include a communication device configured to communicate with a sensor or another control unit, a memory configured to store an operation system, a logic command, or input/output information, and at least one processor configured to perform determination, calculation, decision or the like which are required for responsible function controlling.

Hereinafter, embodiments set forth herein will be described in detail with reference to the accompanying drawings, and the same or similar elements are given the same and similar reference numerals regardless of figure numbers, so duplicate descriptions thereof will be omitted.

Figure 1:
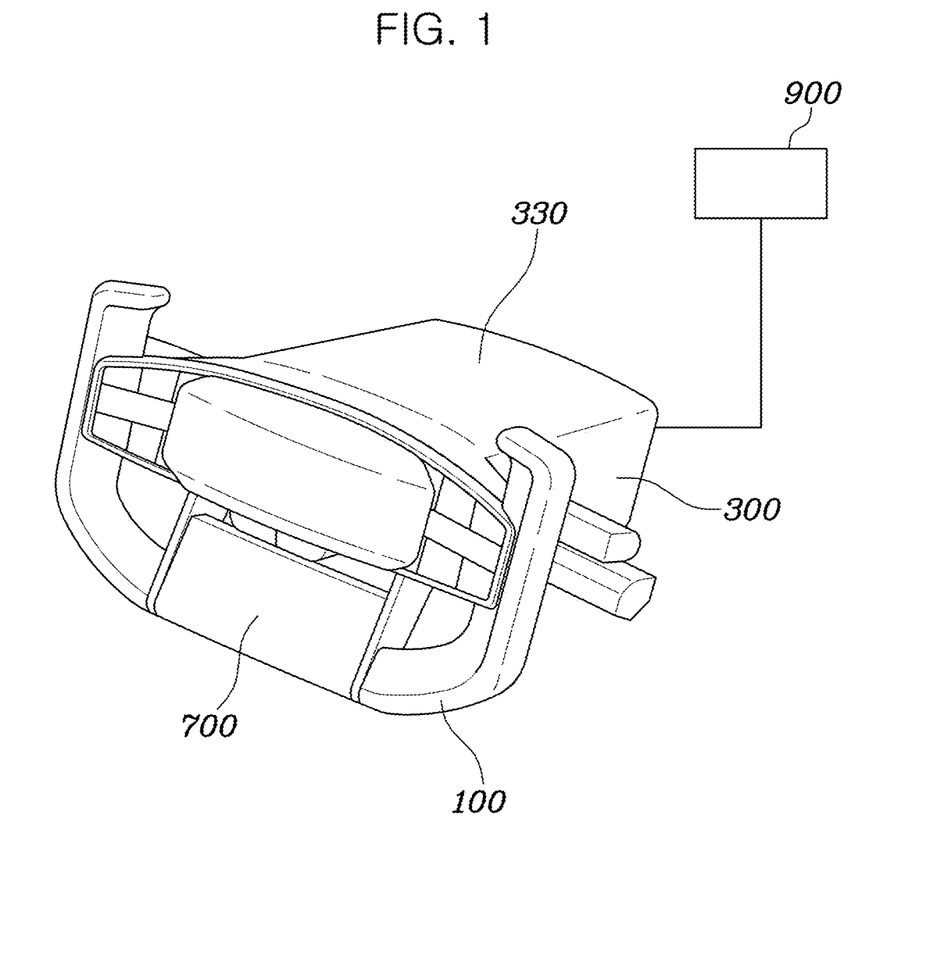
FIG. 1 illustrates a vehicle steering device according to an embodiment of the present disclosure.
Figure 2:
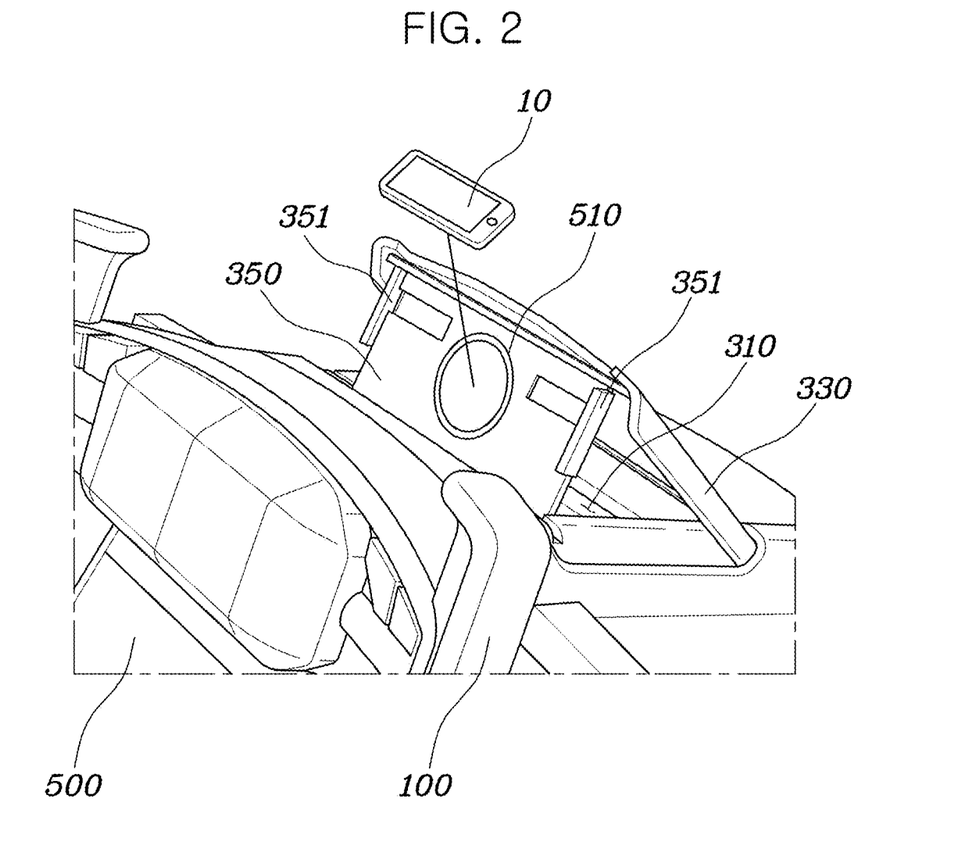
FIG. 2 illustrates a state in which a mounting cover of shroud is rotated to expose a mounting pad.
Figure 3:
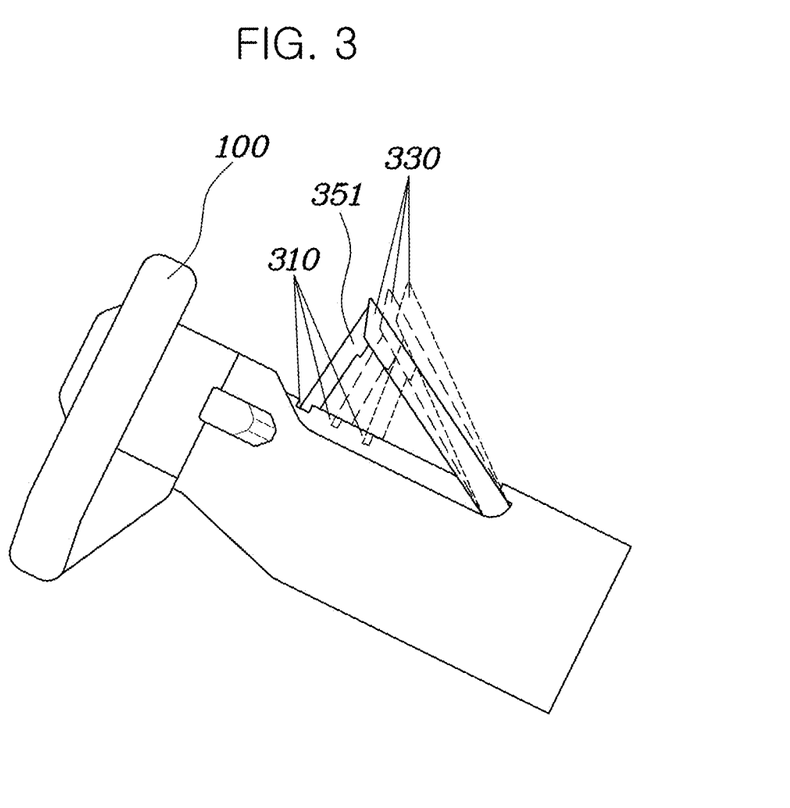

FIG. 1 illustrates a vehicle steering device according to an embodiment of the present disclosure. FIG. 2 illustrates a state in which a mounting cover of a shroud is rotated to expose a mounting pad. FIG. 3 is a side view of the vehicle steering device illustrated to explain mounting of a user terminal through a mounting groove, the mounting pad, and the like.

A vehicle steering device according to the present disclosure includes: a steering wheel 100; a shroud 300 coupled to or with the steering wheel 100 and including, at or in an upper portion thereof, a mounting groove 310 configured to mount a user terminal 10; and a mounting cover 330 hingedly coupled to the upper portion of the shroud 300. When the mounting cover 330 is rotated, the mounting groove 310 is exposed to allow the user terminal 10 to be mounted via the mounting groove 310 and the mounting cover 330.

The vehicle steering device of the present disclosure may adopt any steering method, including manual steering, power steering, electronic control power steering, or steering-by-wire (SBW). Accordingly, a steering shaft, a steering feedback actuator (SFA), or the like may be housed inside the shroud, and the steering wheel may be coupled to the shaft.

Meanwhile, the shroud primarily serves to cover the steering shaft or the like, preventing their exposure to the outside, without performing any other role in assisting driving. Accordingly, the present disclosure provides a mounting support configured to hold a user terminal, such as a smartphone or a smart pad, thereby utilizing the shroud area for a driving assistance function.

Specifically, a mounting cover 330 is hingedly coupled to the upper portion of the shroud 300 to be rotatable around a point on the shroud 300. When the mounting cover 330 is rotated and deployed from the shroud 300, there is provided an environment here a user terminal 10 may be mounted, and when the mounting cover 330 is rotated again and housed within the shroud 300, there is provided an environment where the user terminal 10 is not used.

The upper area of the shroud 300 may be partially exposed by the rotation of the mounting cover 330. In the upper area of the shroud 300 exposed by the rotation of the mounting cover 330, a mounting groove 310 is formed to allow the user terminal 10 to be mounted therein. The mounting groove 310 is a groove that is recessed inwardly in the upper area of the shroud 300, and a side surface of the user terminal 10 may be partially inserted into the mounting groove 310.

The mounting cover 330 is hingedly coupled to be rotatable around a point of the shroud 300, and an elastic body is interposed between the mounting cover 330 and the shroud 300, allowing the mounting cover 330 and the shroud 300 to be coupled via the elastic body. That is, the elastic body prevents the mounting cover 330 from rotating upward from the shroud 300.

Accordingly, the mounting cover 330 is rotated upward to expose the mounting groove 310, and then the bottom surface of the user terminal 10 is partially inserted into the mounting groove 310, allowing the bottom surface of the user terminal 10 to be supported. The top surface of the user terminal 10 is pressed by the mounting cover 330 that is about to rotate downward again by the elastic body, thereby suppressing the user terminal 10 from escaping from the mounting groove 310 to ensure that the user terminal 10 is stably mounted.

As will be described later, the user terminal 10 may be installed in the shroud area to replace the role of the instrument cluster and AVN, or separately perform navigation functions. Existing instrument clusters or AVNs are located on a side of a vehicle driver, leading to poor visibility and narrowing a forward field of view when looking at the display located on the side. According to the present disclosure, a user terminal may be located in the shroud area, which is continuously viewed during driving, providing the advantage of excellent visibility.

Meanwhile, referring to FIG. 3, the mounting groove 310 extends along the width direction of the vehicle, and the mounting groove 310 may be provided at multiple points on the upper portion of the shroud 300. The size varies for each user terminal 10, and the angle at which the mounting cover 330 rotates upward varies depending on the height of the user terminal 10. Accordingly, the multiple mounting grooves 310 may be provided on the upper portion of the shroud 300 to enable mounting of various types of user terminals 10.

In addition, even if the sizes of the mounted user terminals 10 are constant, the optimal mounting angles for achieving the best display visibility of the user terminals 10 may vary depending on the external environment of the vehicle. Accordingly, the multiple mounting grooves 310 are designed to adjust the mounting angle of the user terminal 10 to ensure optimal visibility.

Meanwhile, a hingedly coupled mounting pad 350 may be provided at the other end of the mounting cover 330. The mounting cover 330 may be hingedly coupled at one end to the shroud 300 to be rotatable upward. When the mounting cover 330 rotates upward, the mounting groove 310 on the upper portion of the shroud 300 is exposed, allowing the user terminal 10 to be mounted in the shroud area via the mounting cover 330 and the mounting groove 310. At this time, the bottom and top surfaces of the user terminal 10 are supported by the mounting groove 310 and the mounting cover 330. For more stable mounting of the user terminal 10, a mounting pad 350 may be provided at the other end of the mounting cover 330.

Specifically, the mounting pad 350 is hingedly coupled to the other end of the mounting cover 330 to allow rotation. Since the mounting pad 350 is rotatably hingedly coupled, when the mounting cover 330 rotates upward, the mounting pad 350 may also naturally rotate downward by gravity. The lower portion of the mounting pad 350 may be partially inserted into the mounting groove 310 along with the user terminal 10. The user terminal 10 and the lower portion of the mounting pad 350 are partially inserted together into the mounting groove 310, allowing the bottom surface of the user terminal 10 to be stably supported by the mounting pad 350. Since the mounting pad 350 extends upward and its end is connected to the mounting cover 330, the rear surface of the user terminal 10 may be stably supported by the mounting cover 330.

Figure 4:
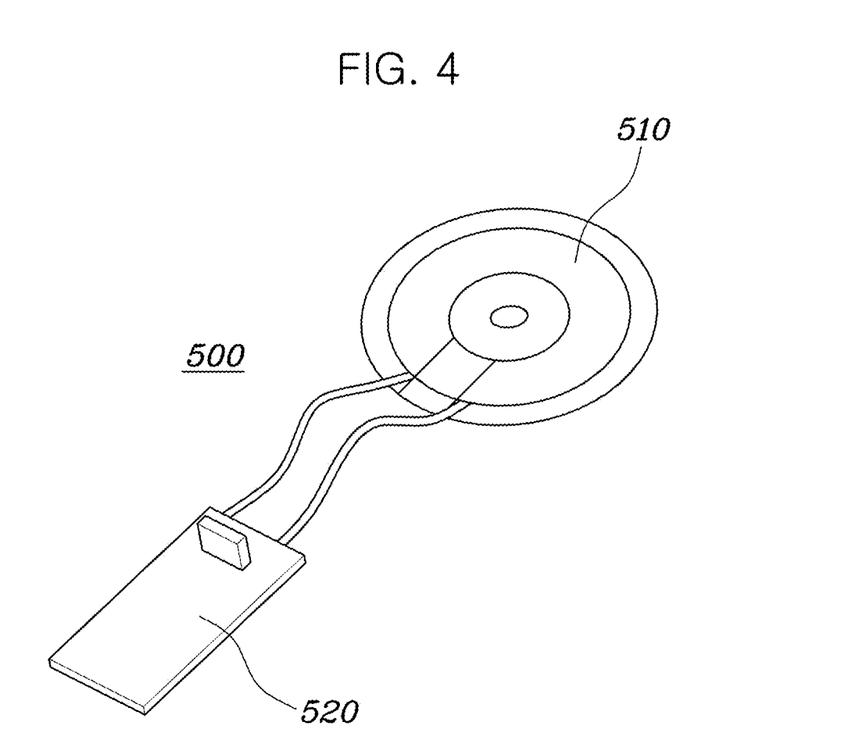
FIG. 4 is a view illustrating a charging module provided inside a mounting pad.

A charging module 500 configured to charge the battery of the user terminal 10 may be provided or disposed inside the mounting pad 350. The charging module 500 may be connected to the vehicle's power source to charge the battery of the user terminal 10. The charging module 500 includes a device capable of wirelessly charging the battery of the user terminal 10. That is, as illustrated in FIG. 4, the charging module may include a coil 510 configured to generate electromagnetic induction and a printed circuit board 520 configured to control the flow of current. The charging module 500 is not limited to wireless charging, and may also be applied to wired charging of the user terminal via a charging wire connected to the vehicle's power source.

Meanwhile, the mounting pad 350 may be provided with a side support 351 to support a side surface of the user terminal 10. When the vehicle is turning, rolling behavior of the vehicle may occur. Accordingly, the user terminal 10 may shift to the left or right. To prevent this, a side support 351 capable of supporting the left or right surface of the user terminal 10 may be provided on the mounting pad 350.

Referring to FIG. 2, it can be seen that side supports 351 are connected to the side surfaces of the mounting pad 350. A pair of side supports 351 is provided, one on the left and one on the right side of the mounting pad 350. The side supports 351 are to be movable to match the size of the user terminal 10. Specifically, the side supports 351 may move left and right, allowing the mounting pad 350 to have a space corresponding to the width of the user terminal 10. The side supports 351 preferably have an outwardly bent shape at the outer ends, and an inwardly recessed groove with a predetermined curved shape on the inner sides. These side supports 351 not only prevent the user terminal 10 from moving left and right, but also prevent the user terminal 10 from moving forward or rearward due to inertia when the vehicle suddenly stops.

Figure 5:
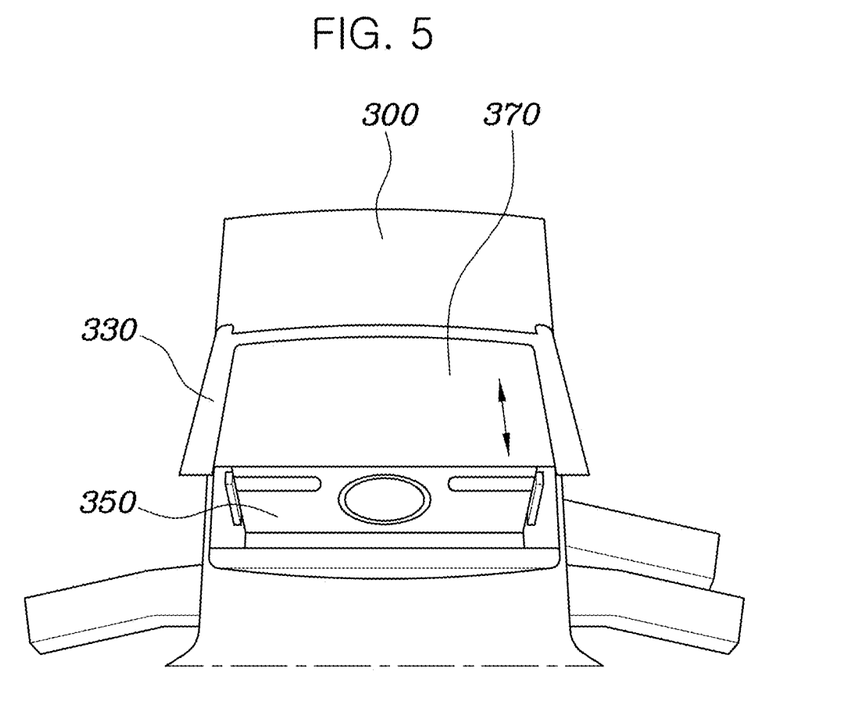
FIGS. 5 and 6 are views illustrating the mounting cover as viewed from above.
Figure 6:
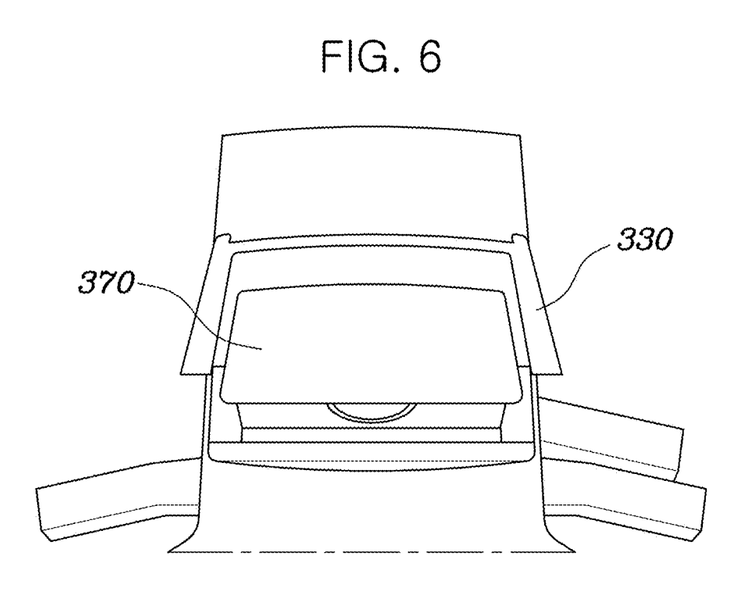

Meanwhile, a sunshade panel 370 that slides and is exposed to the outside of the mounting cover 330 or retracted into the inside of the mounting cover 330 may be provided on the mounting cover 330. FIGS. 5 and 6 illustrate the mounting cover as viewed from above. As mentioned above, the visibility of the display of the user terminal 10 may vary depending on the external environment of the vehicle. In addition, the user terminal 10 is positioned near the windshield glass, which is easily affected by sunlight, and the heat generation of the user terminal 10 may increase due to the operation of the charging module 500, causing the user terminal 10 to operate at a significantly reduced speed or cease functioning altogether. To ensure the stable operation of the user terminal 10, a sunshade panel 370 may be provided to prevent thermal damage from sunlight and ensure the visibility of the display of the user terminal 10.

The sunshade panel 370 may be provided on the inner side of the mounting cover 330 so that, when necessary, the user may slide the sunshade panel 370 to expose it to the outer side of the mounting cover 330, thereby protecting the user terminal 10 from sunlight.

Meanwhile, the vehicle steering device according to the present disclosure may further include a controller 900. The controller 900 may communicate with the user terminal 10 via wired or wireless communication. The controller 900 may acquire information related to the driving of the vehicle from a sensor mounted on the vehicle and transmit this information to the user terminal 10. The user terminal 10 may send the information to the display.

As described above, the user terminal 10 may perform the role of a vehicle's instrument cluster and may further perform the role of an infotainment system. Accordingly, during the driving of the vehicle, power supply to the display of an unnecessary infotainment system may be cut off to reduce unnecessary power consumption.

The user may install a dedicated application in the user terminal 10 to enable communication between the controller 900 and the user terminal 10. The controller 900 may be connected to the user terminal 10 via a wireless connection method such as Bluetooth to transmit driving information to the user terminal 10.

Meanwhile, for better visibility of the user terminal 10, rather than using an O-shaped steering wheel, it may be more desirable to use a yoke-type steering wheel with the upper portion omitted compared to an O-shaped steering wheel.

Figure 7:
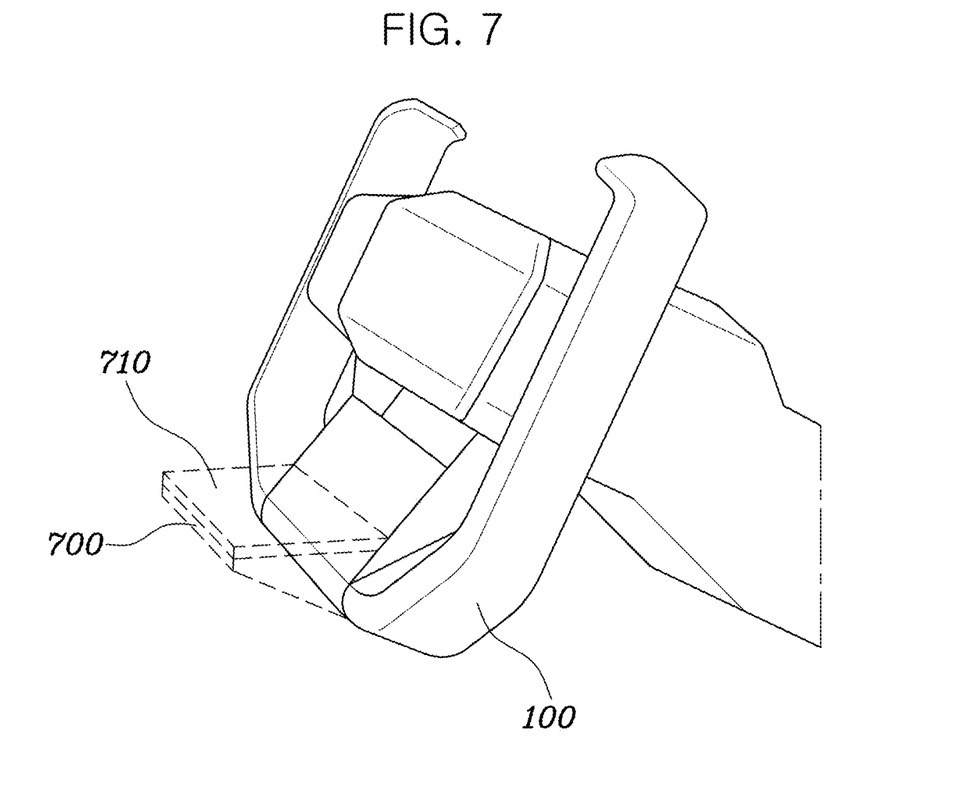
FIG. 7 is a view illustrating the deployment and storage of a table.

The steering wheel 100 according to the present disclosure may include a table 700, which allows simple items to be placed thereon when the vehicle is parked or stopped, thereby enhancing the convenience of the vehicle steering device. Referring to FIG. 7, the table 700 is hingedly coupled to the lower portion of the steering wheel 100. Accordingly, the table 700 may rotate toward the user to be deployed or rotate in the opposite direction to be stored.

Figure 8:
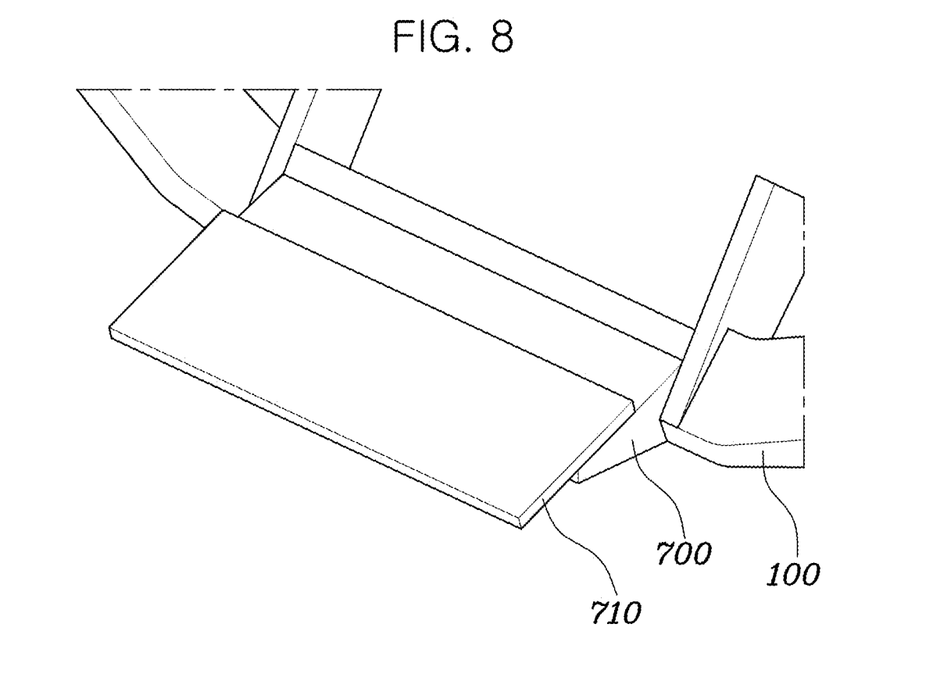
FIG. 8 is a view illustrating the sliding of an auxiliary table.

An auxiliary table 710, which is slidably coupled to one surface of the table 700, may also be provided. Referring to FIG. 8, the auxiliary table 710 is slidably coupled to one surface of the table 700, and when the auxiliary table 710 is slid, the length of the table 700 is substantially extended, so that more items may be placed on the table 700 and the auxiliary table 710.

According to the present disclosure, the user may have a simple meal or take a rest, such as by reading, using the table 700 inside the vehicle.

Meanwhile, it is preferable to use the table 700 only when the vehicle is parked or stopped, and not to use it while the vehicle is being driven. This may be left to the user's discretion, but the deployment and storage of the table 700 may also be controlled through the controller 900.

That is, an electric motor connected to the table 700 may be provided inside the steering wheel 100. Accordingly, the electric motor may be operated to rotate the table 700. The controller 900 may control the operation of the electric motor by supplying power to the electric motor.

The controller 900 may ensure that the table 700 can only be deployed when the vehicle is parked or stopped. In the case where the vehicle is being driven, the table 700 will not be deployed even when the user issues a deployment command, and a notification indicating that the table 700 cannot be deployed may be provided via a display or sound.

Even if the user starts the engine or steps on the accelerator pedal under while the vehicle is parked or stopped, the vehicle will not start if the table 700 is deployed, and this situation may be notified through the display or sound.

Figure 9A:
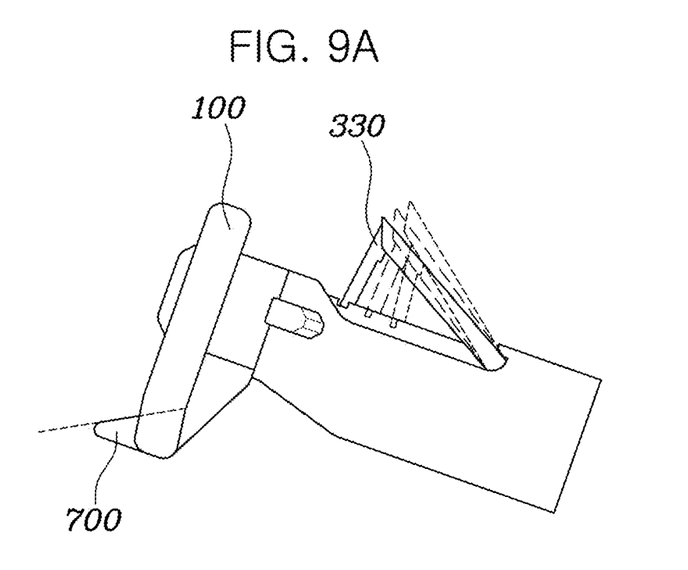
FIGS. 9A and 9B and FIGS. 10A and 10B are views illustrating the adjustment of the electric motor or the tilting angle of the steering wheel to ensure that the table remains parallel to the ground.
Figure 9B:
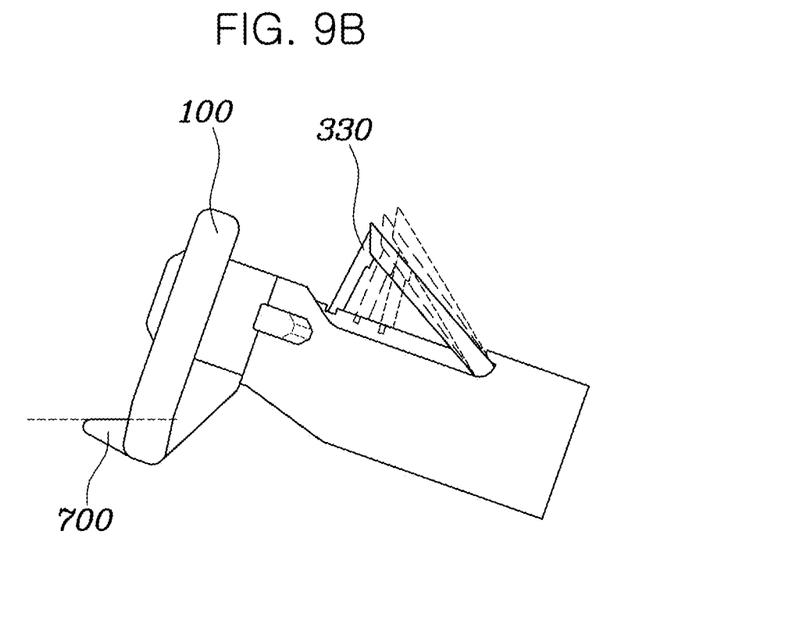

Meanwhile, the steering wheel 100 allows the user to perform telescoping adjustments or adjust the tilting angle of the steering wheel 100 according to their body shape. When the tilting angle of the steering wheel 100 changes, the angle between the table 700 and the ground may also change when the table 700 is deployed, which may cause the table 700 to not remain parallel to the ground. Therefore, depending on the tilting angle of the steering wheel 100, the controller 900 may operate an electric motor to adjust the deployment angle of the table 700 to ensure that the table remains parallel to the ground. Referring to FIGS. 9A, 9B, it may be identified that, although the tilting angle of the steering wheel 100 does not change, the deployment angle of the table 700 is adjusted to ensure that the table 700 remains parallel to the ground.

Figure 10A:
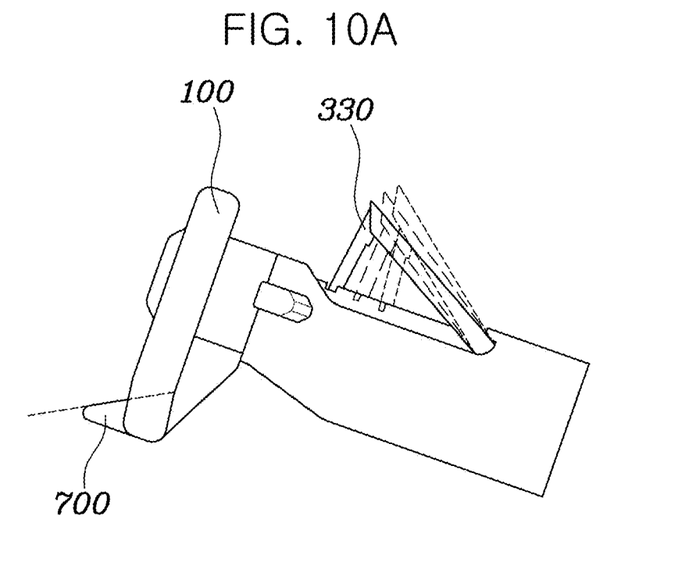
Figure 10B:
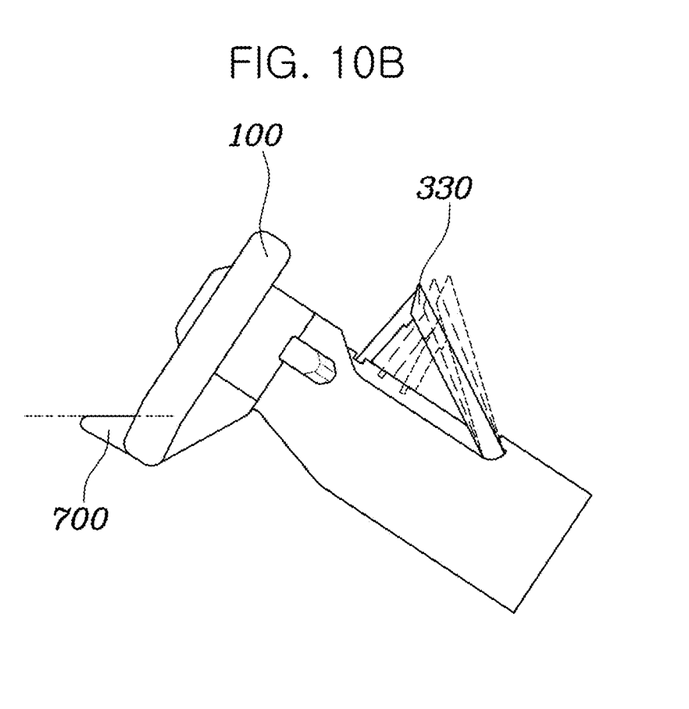

Alternatively, in another embodiment, when the user issues a command to deploy the table 700 while the vehicle is parked or stopped, the controller 900 may adjust the tilting angle of the steering wheel 100 during deployment to ensure that the table 700 remains parallel to the ground. Referring to FIGS. 10A, 10B, it may be identified that while the angle between the table 700 and the steering wheel 100 remains unchanged, the tilting angle of the steering wheel 100 is adjusted to ensure that the table 700 remains parallel to the ground.

In other words, the controller 900 may control the electric motor connected to the table 700 or adjust the tilting angle of the steering wheel 100 connected to the table 700 to adjust the angle between the table 700 and the ground. The embodiment involving control of the electric motor is preferably implemented in a temporary parking state where the vehicle is expected to be driven, whereas the embodiment involving control of the tilting angle of the steering wheel 100 is preferably implemented in a stationary state where the vehicle is not expected to be driven for an extended period of time.

Although the present disclosure has been described and illustrated in conjunction with particular embodiments thereof, it will be apparent to those skilled in the art that various improvements and modifications may be made to the present disclosure without departing from the technical idea of the present disclosure defined by the appended claims.

What is claimed is:

1. A vehicle steering device comprising:
a steering wheel for a vehicle;
a shroud coupled to the steering wheel and comprising, at an upper portion thereof, a mounting groove configured to mount a user terminal; and
a mounting cover hingedly coupled to the upper portion of the shroud,
wherein the shroud and mounting cover are configured such that when the mounting cover rotates, the mounting groove is exposed to allow the user terminal to be mounted via the mounting groove and the mounting cover.

2. The vehicle steering device of claim 1, wherein the mounting groove extends along a width direction of the vehicle and is provided at multiple points on the upper portion of the shroud, allowing a mounting position of the user terminal to be adjusted depending on a size or a mounting angle of the user terminal.

3. The vehicle steering device of claim 1, wherein the mounting cover has a first end hingedly coupled to the shroud and a second end provided with a hingedly coupled mounting pad to support a rear surface of the user terminal.

4. The vehicle steering device of claim 3, wherein the mounting pad comprises a charging module configured to charge a battery of the user terminal.

5. The vehicle steering device of claim 3, wherein the mounting pad comprises a side support configured to support a side surface of the user terminal.

6. The vehicle steering device of claim 3, wherein the mounting cover comprises a sunshade panel configured to slide to be exposed to an outer side of the mounting cover or to be retracted into an inner side of the mounting cover.

7. The vehicle steering device of claim 1, further comprising a controller configured to transmit driving-related information of the vehicle to the user terminal,
wherein the user terminal is configured to send the driving-related information to a display.

8. The vehicle steering device of claim 1, wherein the steering wheel comprises a lower portion and a table hingedly coupled to the lower portion and configured to be deployed by rotation.

9. The vehicle steering device of claim 8, wherein the table comprises a surface and an auxiliary table slidably coupled to the surface.

10. The vehicle steering device of claim 8, further comprising:
a controller; and
an electric motor disposed inside the steering wheel and configured to adjust a deployment angle of the table,
wherein the controller is configured to control the electric motor depending on a tilting angle of the steering wheel to adjust a deployment of the table such that the table remains parallel to ground.

11. The vehicle steering device of claim 8, further comprising a controller configured, during the deployment of the table, to change a tilting angle of the steering wheel to maintain the table parallel to ground.

12. The vehicle steering device of claim 1, wherein the steering wheel is of a yoke type.

* * * * *